(12) United States Patent
Anliker (10) Patent No.: US 7,165,366 B2
(45) Date of Patent: Jan. 23, 2007

(54) CONDUIT BOX AND METHOD OF INSTALLING CONDUIT

(76) Inventor: Greg M. Anliker, 545 N. Airlite St., Elgin, IL (US) 60123

( * ) Notice: Subject to any disclaimer, the term of this patent is extended or adjusted under 35 U.S.C. 154(b) by 126 days.

(21) Appl. No.: 10/659,072

(22) Filed: Sep. 10, 2003

(65) Prior Publication Data
US 2005/0050807 A1    Mar. 10, 2005

(51) Int. Cl.
*E04C 2/52* (2006.01)
(52) U.S. Cl. .................. 52/220.4; 52/220.5; 174/64
(58) Field of Classification Search ............ 52/220.1, 52/220.2, 220.4, 220.7, 220.5; 174/64, 65 R, 174/60, 19
See application file for complete search history.

(56) References Cited

U.S. PATENT DOCUMENTS

| | | | | |
|---|---|---|---|---|
| 982,841 | A * | 1/1911 | Maison ................. | 220/3.9 |
| 1,857,787 | A * | 5/1932 | Meeks et al. .......... | 220/3.94 |
| 3,659,037 | A * | 4/1972 | MacDonald ........... | 174/58 |
| 3,863,037 | A * | 1/1975 | Schindler et al. ..... | 174/58 |
| 4,634,015 | A | 1/1987 | Taylor | |
| 5,005,792 | A * | 4/1991 | Rinderer ............... | 248/205.1 |
| 5,117,996 | A * | 6/1992 | McShane ............... | 220/3.7 |
| 5,189,259 | A * | 2/1993 | Carson et al. ......... | 174/66 |
| 5,239,132 | A | 8/1993 | Bartow | |
| 5,448,012 | A | 9/1995 | Jacob | |
| 6,207,894 | B1 * | 3/2001 | Reiker ................... | 174/48 |
| 6,209,836 | B1 | 4/2001 | Swanson | |
| 6,268,563 | B1 * | 7/2001 | Gretz .................... | 174/53 |
| 6,369,322 | B1 * | 4/2002 | Gretz .................... | 174/50 |
| 6,796,684 | B1 * | 9/2004 | Beadle .................. | 362/287 |
| 6,806,426 | B1 * | 10/2004 | Gretz .................... | 174/67 |
| 6,837,726 | B1 * | 1/2005 | Kiermaier ............. | 439/235 |
| 6,881,900 | B2 * | 4/2005 | Halbert ................. | 174/58 |

* cited by examiner

*Primary Examiner*—Naoko Slack
*Assistant Examiner*—Chi Q. Nguyen
(74) *Attorney, Agent, or Firm*—Meroni & Meroni, P.C.; Charles F. Meroni, Jr.; Christopher J. Scott (57) ABSTRACT

A device for aligning conduit. The device is positioned within a corrugated deck layer configured under a roof structure wherein the device comprises a box having a top, a front, a back and opposing sidewalls. The top includes bevel portions downwardly extending from the top to the sidewalls while the sidewalls vertically extend from the bevel portions to be positioned perpendicular with the top. The bevel portions are sized and shaped to nest within the corrugated deck layer. A pair of flanges is disposed in a common plane relative to one another and at right angles to the sidewalls below the bevel portions to extend outwardly from the bevel portions and the sidewalls wherein the flanges are sized and shaped to fasten the box to the corrugated deck layer. The invention further comprises a method of installing conduit free of offsets into the box.

7 Claims, 7 Drawing Sheets

CONDUIT BOX AND METHOD OF INSTALLING CONDUIT

BACKGROUND OF THE INVENTION

The present invention relates to a conduit box and a method of installing conduit into the conduit box. In particular, the present invention relates to a conduit box that improves conduit installation by disposing conduit free of offsets near the conduit box during installation.

In typical construction installations, conduits, such as electrical conduit, mechanical conduit and tubing, are installed to a roof deck wherein the roof deck comprises a corrugated channel. Typically, the square shaped conduit boxes are fastened to the bottom of the corrugated channel while the conduit is disposed within the channel. This configuration, however, requires that each conduit offset once to enter the conduit box and offset once again to exit the conduit box since the conduit box is fastened below the corrugated channel.

Accordingly, in present commercial conduit boxes, the installation requires numerous labor steps and material consumption due to the offsets required. In a typical installation, the installer fastens the conduit box to the bottom of the corrugated channel and installs conduit through the corrugated channel up to the conduit box. Next, the installer must measure the offset between each conduit and the conduit box. The installer then processes a piece of conduit or fitting through a bending machine to produce a conduit piece/fitting matching the offset dimension required. Next, the installer connects the conduit piece/fitting to the conduit and the conduit box via the conduit piece/fitting. After connecting the conduit to the side of the conduit box, the installer repeats the process for the other side of the conduit box.

Typically, the installer must move between the elevated conduit box and the grounded bending machine which requires the installer to climb a ladder or to harness into a lift for each move between the conduit box and the bending machine. Alternatively, the bending machine may be elevated with the installer. This configuration, though, still requires additional back and forth steps of processing the offsets. Accordingly, the offsets increase the labor steps and material consumption. Additionally, the offsets increase the difficulty of pulling wire through the conduit since the wire can become jammed, i.e. a "bottleneck", at each offset. Furthermore, the National Electrical Code limits the number of offsets in a conduit run:

358.62 Bends—Number In One Run: "There shall not be more than the equivalent of four quarter bends (360° total) between pull points, for example, conduit bodies and boxes." (National Electrical Code 2002).

In a typical installation, the installer uses two 30° bends to make an offset wherein one offset equals 60° of bend. Accordingly, an offset entering the conduit box and an offset exiting a conduit box equals 120°. Therefore, almost one third of the allowable bends are accumulated at one conduit box.

When the installer positions the conduit box against the corrugated channel, the installer fastens the conduit box to the corrugated channel via fasteners such as screws. In a typical installation, the conduit box requires a separate support structure such as uni-strut when the conduit box supports fixtures or fans.

Efficiently and quickly installing conduit is essential for today's fast paced/turn key construction projects. Multiple labor steps and material consumption experienced in typical construction leads to costly and time consuming installation. Accordingly, an installer must work faster leading to increased safety risks and poor quality installations.

Thus, a need exists for an improved method of installing conduits. The solution, though, must eliminate costly labor steps and material consumption. The solution must also improve efficiency while maintaining safety standards. The solution, however, must provide a convenient method of easily disposing conduit and pulling wire through the conduit. Thus, a need exists to provide an efficient connection to the disposed conduit which eliminates offsets between the conduit box and the disposed conduit. A need also exists for installing conduit boxes without extra supports. The solution, though, must provide for a substantial load capacity such as a ceiling fan. Additionally, a need exists for an efficient method of manufacturing an improved conduit box. The prior art fails to meet the needs since the prior art does not efficiently eliminate labor steps and material consumption.

U.S. Pat. No. 4,634,015 issued to Taylor discloses an adjustable electrical box attachment for use on conventional electrical junction boxes. The box includes a mounting plate and a collar, open at the front and rear ends, disposed on a mounting plate about a central opening. The mounting plate is positioned to slide forward and reward within the collar to contact the sidewalls of the collar to be flush against the sidewalls to properly position a light switch against the wall.

U.S. Pat. No. 5,448,012 issued to Jacob discloses a method of installing electrical conduit between a pair of non adjacent electrical boxes positioned within a wall. The boxes include at least one section of a greater depth than the remainder of the box while the normally interfering box is installed in an inverse orientation with respect to the first box wherein the conduit connecting the pair of non adjacent boxes passes behind the area of lesser depth.

U.S. Pat. No. 5,239,132 issued to Bartow discloses a device for retaining an electrical junction box in flush relationship with a wall or a ceiling with a strip. The ends of the strap are longitudinally bifurcated to provide fingers to be deformed around the edges of the box as well as the outer surface. Wings extending out from a side edge of the strap are used to provide support against the inner wall surface to prevent inward falling of the box or to prevent downward slipping of the box with respect to the wall.

U.S. Pat. No. 6,209,836 issued to Swanson discloses a mounting bracket for supporting an electrical box between a pair of stud walls. The bracket is a one piece, unitary member stamped from sheet metal. The mounting bracket has top support rail, a bottom support rail and a pair of mounting ends coupling the support rails together to define a cutout which prevents vertical movement of the electrical box.

U.S. Pat. No. 6,369,322 issued to Gretz discloses a one piece plastic molded box having an open face member, an open back, an extender positioned coplanar with and extending from the face member and four wings extending from the face member. The extender inserts into an electrical box with the wings flexed toward each other to position the extender flush with the electrical box to form a device insulator.

These prior art devices fail to meet the present needs since the devices are designed to fit between stud walls where boxes will be interfering with each other as opposed to securely mounting a conduit box in corrugated roofing. Additionally, these devices do not eliminate labor steps or eliminate material consumption during conduit installation in corrugated roofing. Further, these devices do not provide efficient mounting for corrugated roofing installation since these devices do not eliminate offsets between the conduit and conduit box. Additionally, these devices are not designed for substantial load support such as ceiling fans and heavy lighting fixtures. Additionally, these devices provide knock outs which are stacked directly upon one another preventing any tightening of upper or back connectors.

SUMMARY OF INVENTION

The present invention relates to a conduit box and a method of installing conduit into the conduit box. In particular, the present invention relates to a conduit box that improves conduit installation by disposing conduit free of offsets near the conduit box during installation.

In an embodiment, the present invention relates to an improvement in a building structure. The building structure has upright walls and a roof structure wherein the roof structure has a coating layer, an insulation layer positioned below the coating layer and a deck layer positioned below the insulation layer wherein the deck layer includes at least one corrugated channel formed by downwardly projecting beveled channel sides connected by a channel top and terminated by a channel bottom. At least one conduit is disposed within the corrugated channel.

The improvement comprises a box sized and shaped within the downwardly projecting beveled channel sides wherein the box has a top, a front, a back and opposed sidewalls. The top has bevel portions extending downwardly from the top toward the sidewalls wherein the bevel portions are shaped to nest within the downwardly projecting channel sides provided by the corrugated channel.

The improvement further comprises a pair of flanges positioned on the sidewalls below the bevel portions to extend outwardly from the bevel portions and the sidewalls. The flanges are sized and shaped to be positioned co-planar in abutment with the channel bottom while positioning the box within the corrugated channel. Additionally, the at least one conduit is disposed through the corrugated channel and the box such that the at least one conduit is free of offsets between the corrugated channel and the box.

In an embodiment, the present invention comprises a device for aligning conduit positioned within a corrugated deck which is positioned under a roof structure. The device comprises a box having a top, a front, a back and opposing sidewalls. The top has bevel portions downwardly extending from the top to the sidewall while the sidewalls vertically extend from the bevel portions to be positioned perpendicular with the top wherein the bevel portions are sized and shaped to nest within the corrugated deck.

The present invention further comprises a pair of flanges disposed in a common plane relative to one another and at right angles to the sidewalls below the bevel portions to extend outwardly from the bevel portions and the sidewalls. The flanges are sized and shaped to fasten the box to the corrugated deck.

In an embodiment, the present invention further comprises a method of installing conduit free of offsets within a corrugated deck which is positioned below a roof structure. The method comprises inserting bevel portions of a box within the corrugated deck. Next, a pair of flanges positioned near sidewalls of the box are fastened to a bottom of the corrugated deck with at least one fastener. The method of installing further comprises disposing the conduit positioned with the corrugated deck in a straight form free of offsets into the box.

In an embodiment, the method comprises manufacturing a conduit device comprising forming a box from a flat working piece of material by stamping a top, a front, a back, and sidewalls from the flat working piece wherein the top has a pair of beveled portions. The method further comprises forming flanges wherein the flanges are formed in a common plane relative to one another and at right angles to the sidewalls. Next, the method comprises folding the back 90° toward one of the sidewalls; folding one of the sidewalls 90° toward the front; folding the other sidewall toward the front; and welding the conduit box to form.

An advantage of the present invention is that it improves the efficiency of conduit installation.

Another advantage of the present invention is that it eliminates offsets between the conduit and the conduit box.

Another advantage of the present invention is that it increases the efficiency of pulling wire through the conduit.

DETAILED DESCRIPTION OF THE INVENTION

As discussed above, the present invention provides improved and varied skills and other accommodations for a conduit box and a method of installing conduit into a conduit box. In particular, the present invention relates to a conduit box that improves conduit installation by disposing conduit free of offsets near the conduit box during installation.

Figure 1:
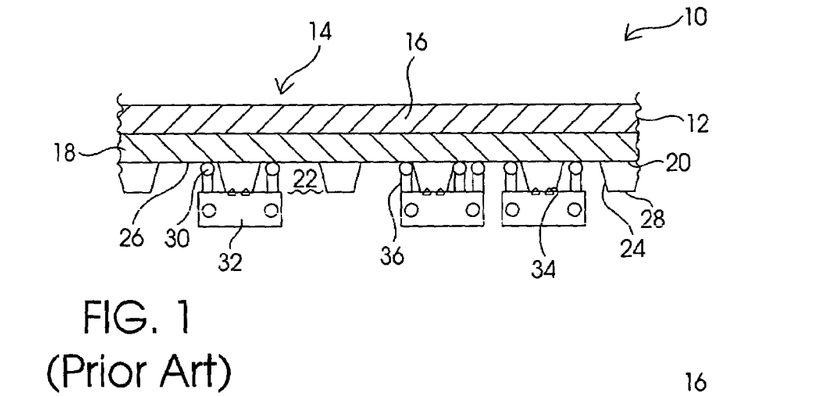
FIG. 1 diagramatically illustrates in cross sectional view a typical installation.

FIG. 1 illustrates in a cross sectional view a typical building structure generally shown as 10. The building structure 10 includes upright walls 12 and a roof structure generally shown as 14. The roof structure 14 in turn comprises a coating layer 16, an insulation layer 18 positioned below the coating layer 16 and a deck layer 20 positioned below the coating layer 16.

The deck layer 20 includes a corrugated channel 22 formed by downwardly projecting beveled channel sides 24 which are connected by a channel top 26 and terminated by a channel bottom 28. Additionally, the building structure 10 positions a conduit(s) 30 within the corrugated channel 22. Accordingly, in the building structure 10, the coating layer 16 is exposed to the elements while the deck layer 20 is exposed to the interior of the building structure 10.

Figure 2:
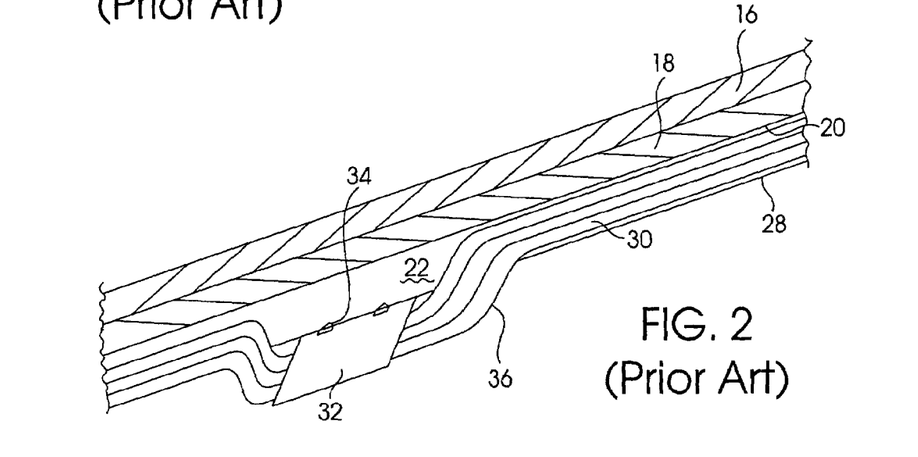
FIG. 2 diagramatically illustrates a perspective view of FIG. 1.

A conduit box 32 is fastened to the channel bottom 28 by fasteners 34 which extend through the channel bottom 28. Since the downwardly projecting beveled channel sides 24 extend beyond the deck layer 20, the conduit 30 is disposed in the corrugated channel 22 between the deck layer 20 and the conduit box 32. Referring to FIG. 2, conduit boxes 32 may be fastened to the roof structure 14 with multiple conduits 30 disposed within the channel 22.

Figure 3:
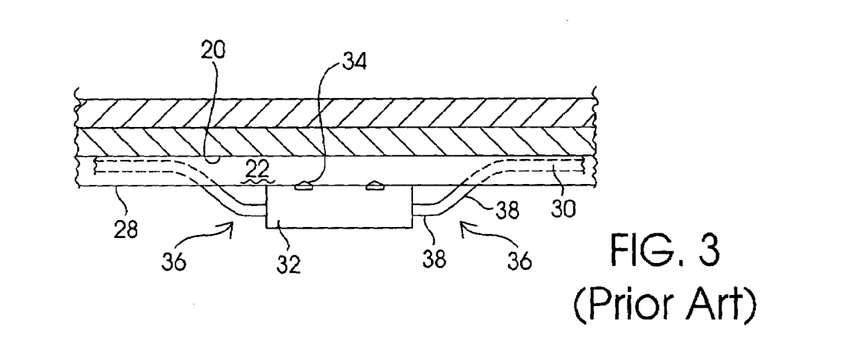
FIG. 3 diagramatically illustrates a side elevation view of FIG. 1 with the fragmentary pipe bends being shown in full and dotted lines.

Turning to FIG. 3, the typical installation is shown in a side elevation view. The conduit 30 is disposed through the corrugated channel 22 wherein the conduit is fastened flush to the deck layer 20 via hangers/fasteners (not shown). Since the conduit box 32 is positioned on the channel bottom 28 and below the conduit 30, the conduit 30 must offset 36 prior to entering the conduit box 32. Consequently the conduit 30 must offset 36 again exiting the conduit box 32. Typically, each offset 36 requires two bends 38 to compensate for the angle between the corrugated channel 22 and the conduit box 32.

Figure 4:
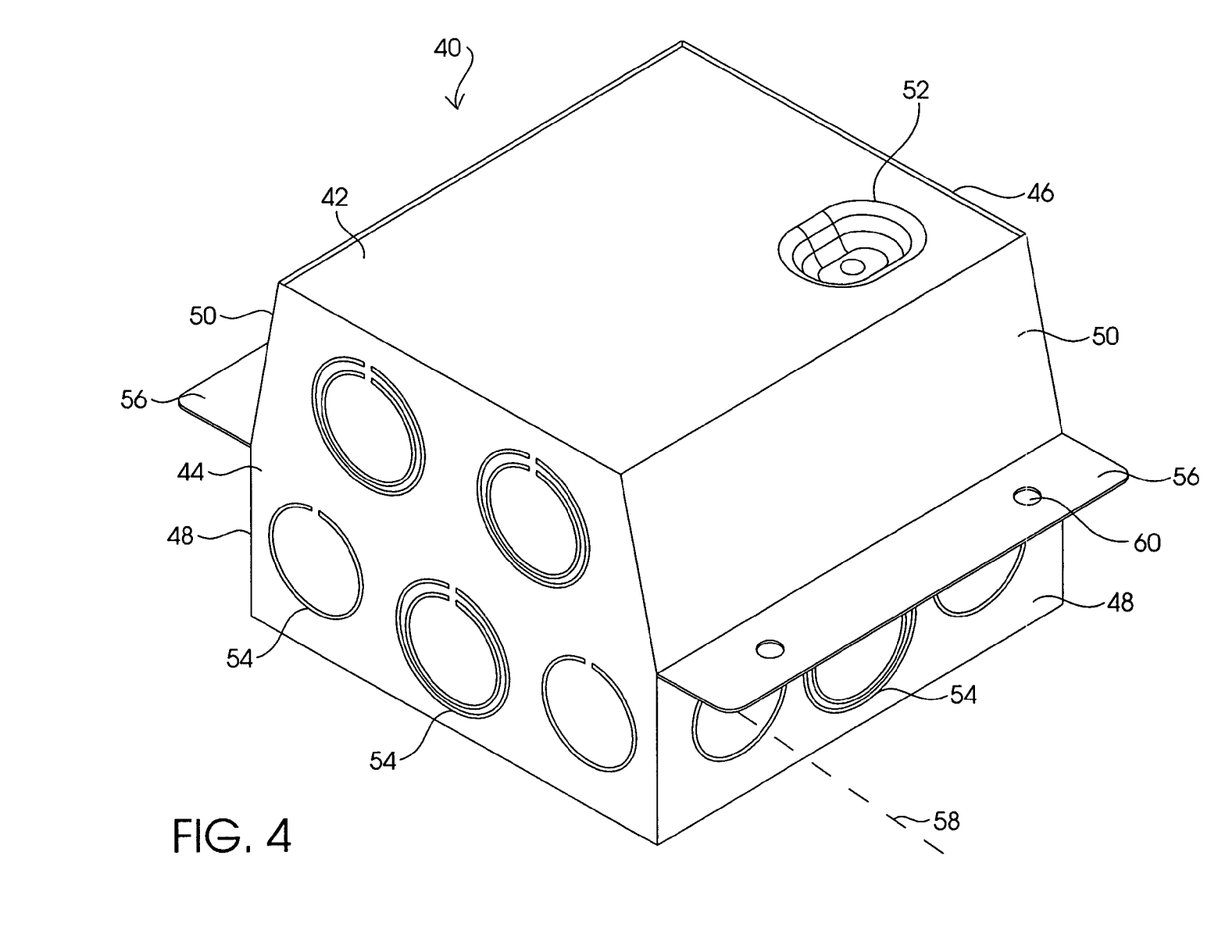
FIG. 4 illustrates in a perspective view an embodiment of the present invention.

Turning to FIG. 4, an exemplary conduit box generally shown as 40 is illustrated. The conduit box 40 is sized and shaped to fit within the downwardly projecting beveled channel sides 24 (shown in FIG. 1). The box 40 has a top 42, a front 44, a back 46 and opposed sidewalls 48. The top 42 has bevel portions 50 which extend downwardly from the top 42 toward the sidewalls 48. The sidewalls 48 extend downward from the bevel portions 50 to be perpendicularly positioned with the top 42.

The top 42 includes a recessed tapped bonding hole 52 which allows for proper grounding. Additionally, the front 44 and back 46 position a plurality of knock outs 54 in a staggered formation. Accordingly, the knockouts are not stacked directly upon one another which prevent tightening of upper and/or back connectors. The knockouts 54 may be configured in a variety of sizes and configurations. In an embodiment, the knock outs 54 comprise ½" knock outs 54 and ½"–¾" concentric knock outs 54. In other knockout sizes are used, and it is understood that my invention also embraces the usage of conduit boxes with other sized knockouts. The sidewalls also include a plurality of knock outs 54 with different sizes and configurations. The staggered formation and the different sizes/configurations of the knock outs 54 improve wire pulling resulting in faster installation.

The bevel portions 50 bevel from the top 42 toward the sidewalls 48 at an angle less than or equal to 90°. In an embodiment, the bevel portions 50 bevel at an angle of 45°. The bevel portions 50 are angularly shaped to nest within the downwardly projecting channel sides 24 (shown in FIG. 5) as will be discussed. Further in an embodiment, the bevel portions 50 are configured shorter than the sidewalls 48 to properly nest within the downwardly projecting channel sides 24.

As shown in FIG. 4, a pair of flanges 56 is positioned on the sidewalls 48 below the bevel portions 50 wherein the flanges 56 extend outwardly from the bevel portions 50 and the sidewalls 48. The flanges are disposed in a common plane 58 relative to one another to extend at right angles to the sidewalls 48. The flanges 56 are sized and shaped to extend outwardly to fasten, via mounting holes 60, to the channel bottom 28 (shown in FIG. 5). Additionally, the flanges 56 are sized and shaped to hold heavy fixtures such as ceiling fans or various light fixtures. In an embodiment, the flanges 56 are detachable from the sidewalls 48.

Figure 5:
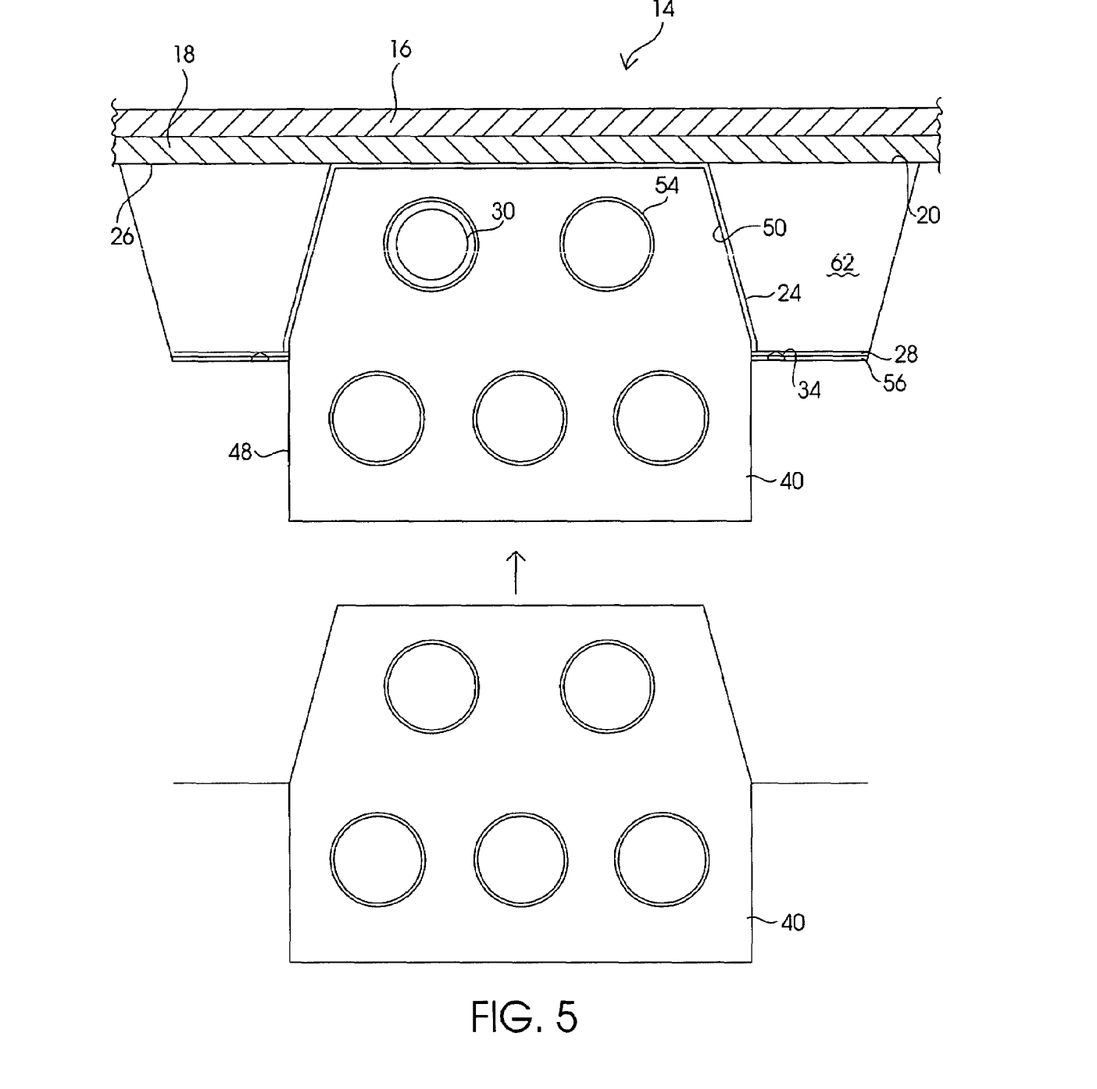
FIG. 5 illustrates in a cross sectional view an embodiment of the present invention.

Turning to FIG. 5, the conduit box 40 is shown being installed within the corrugated channel 22 of the corrugated deck layer 20 which is positioned below the roof structure 14. Since the bevel portions 50 are sized and shaped to fit within the corrugated channel 22 of the corrugated deck layer 20, the bevel portions 50 nest with the downwardly projecting beveled channel sides 24 provided by the corrugated channel 22. Accordingly, during manufacturing of the conduit box 40, the bevel portions 50 are stamped at an angle less than or equal to 90°. Thus, during installation, the installer measures the downwardly projecting beveled channel sides 24 with respect to the corrugated deck layer 20 and configures the bevel portions 50 to match during the manufacturing of the conduit box 40 as will be discussed.

After the installer lifts and nests the bevel portions 50 into the corrugated channel 22, the installer fastens the pair of flanges 56 to the corrugated deck layer 20. Since the flanges 56 are disposed in a common plane relative to one another below the bevel portions 50 and at right angles to the sidewalls 48, the flanges are fastened co-planar with the corrugated deck layer 20 such that the flanges are sized and shaped to be positioned co-planar in abutment with the channel bottom 28 provided by the corrugated deck layer 20. The installer uses fasteners 34, such as screws, which fasten the flanges 56 to the channel bottom 28 through the mounting holes 60 (shown in FIG. 4). In my preferred embodiment, the flanges 56 provide the only box areas which are engaged with the corrugated deck layer 20. An installer may slide the box one way or the other to engage the box side wall against the corrugation wall, but ideally the box will be in gap relation except where the flanges 56 are screwed to the corrugated deck.

The fasteners 34 terminate within a horizontal plane 62 defined by the corrugated deck layer 20 and the roof structure 14. In particular, the horizontal plane 62 is defined by the channel top 26 and the channel bottom 28. Thus, the size, shape and positioning of the flanges 56, eliminate any use of extra support structures such as uni-strut. The size, shape and positioning of the flanges 56, though, allows adequate strength to support heavy fixtures such as ceiling fans or various light fixtures (not shown). Still further, the positioning of the flanges 56 in co-planar abutment with the channel bottom 28 positions at least one of the concentric knockouts 54 within the corrugated channel 22. After nesting the bevel portions 50 with the downwardly projecting beveled channel sides 24, conduit 30 is disposed through the conduit box 42.

Figure 6:
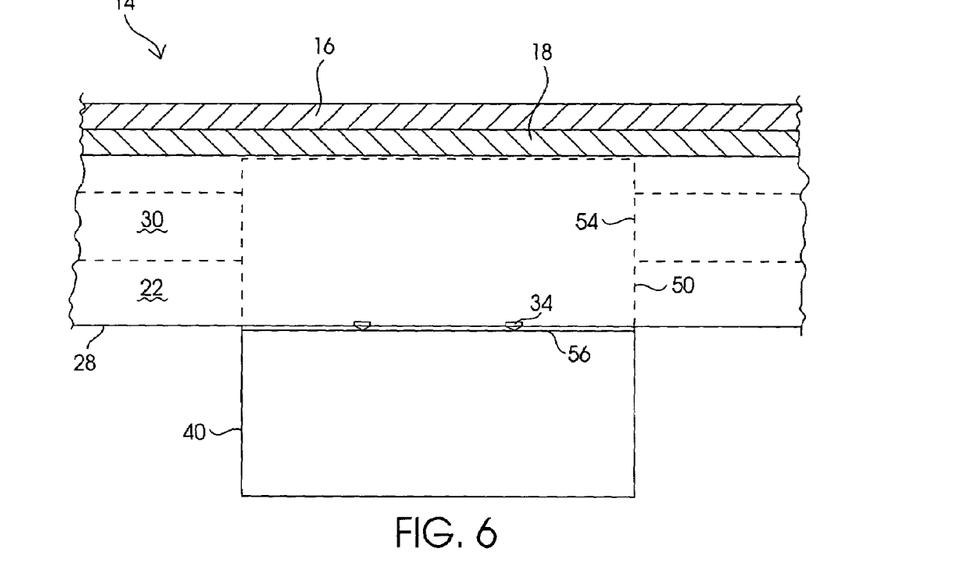
FIG. 6 illustrates in a side elevation view a method of use of an embodiment of the present invention.

Turning to FIG. 6, the conduit box 42 is shown in a side elevation view positioned below the coating layer 16 and insulation layer of the roof structure 14. After fastening the pair of flanges 56 to the channel bottom 28, the installer disposes the conduit 30 within the corrugated deck layer 20 and into the conduit box 40. Since the bevel portions 50 and at least one of the knockouts 54 are positioned within the corrugated channel 22, the conduit 30 is disposed in a straight form with the conduit box 40. Next, the installer pulls wire (not shown) through the conduit 30 and the conduit box 40.

During installation and use, the conduit 30 is disposed directly into the conduit box 40 free of any offsets. Accordingly, the installer does not have to create any bends in the conduit 30 and/or the installer does not have to insert any fittings between the conduit 30 and the conduit box 40. Accordingly, the conduit box 40 of the present invention increases the installation efficiency by eliminating the offsets resulting in saved labor steps and material consumption. Additionally, the conduit box 40 of the present invention eliminates the bends which are regulated by the National Electrical Code leading to increased efficiency of the wire pulling.

Figure 7:
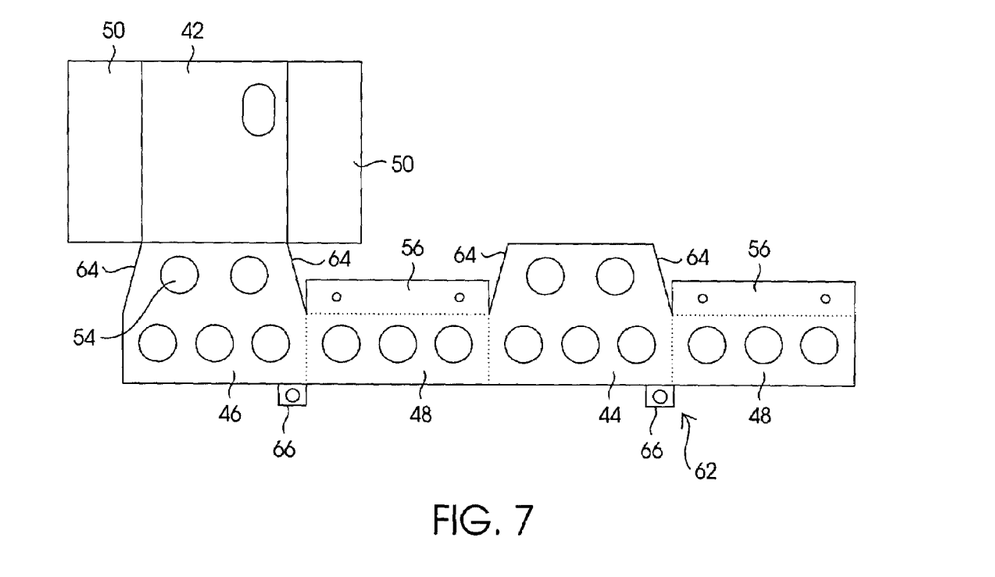
FIG. 7 illustrates in a plan view a method of manufacturing of an embodiment of the present invention.

Turning to FIGS. 7 and 8, a method of manufacturing an embodiment of the conduit box 40 of the present invention is illustrated. In FIG. 7, a flat working piece generally shown as 62 is illustrated. The working piece 62 is stamped in one piece with different sections including the top 42, the front 44, the back 46, the sidewalls 48, the bevel portions 50 and the flanges 56. Additionally, tabs 66 are stamped on the front 44 and the back 46 where the tabs 66 provide mounts for fixtures such as ceiling fans and various light fixtures. Accordingly, one flange 56 is formed on the first sidewall 48 and another flange 56 is formed on the second sidewall 48. In an embodiment, the flanges 56 may be detachable from the sidewalls 48. As illustrated, the bevel portions 50 are connected to the top 42 wherein side edges 64 of the front 44 and the back 46 are sized and shaped similar to the bevel portions 50 as will be discussed. Additionally, a plurality of knock outs 54 are punched through the front 44, the back 46 and the sidewalls 48.

Figures 8A, 8B:
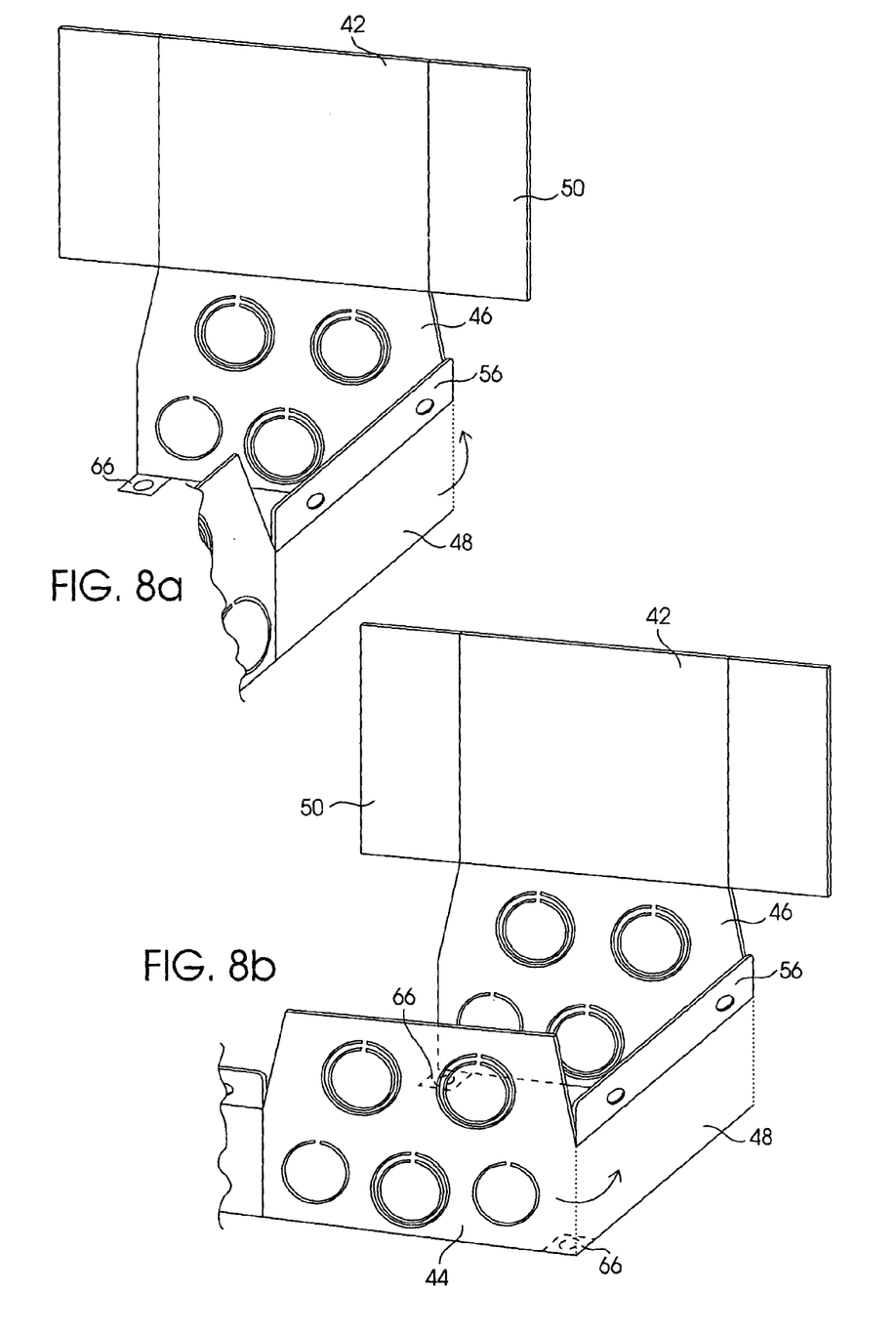
FIGS. 8a–8e illustrate in a perspective view a method of manufacturing of an embodiment of the present invention.
Figure 8C:
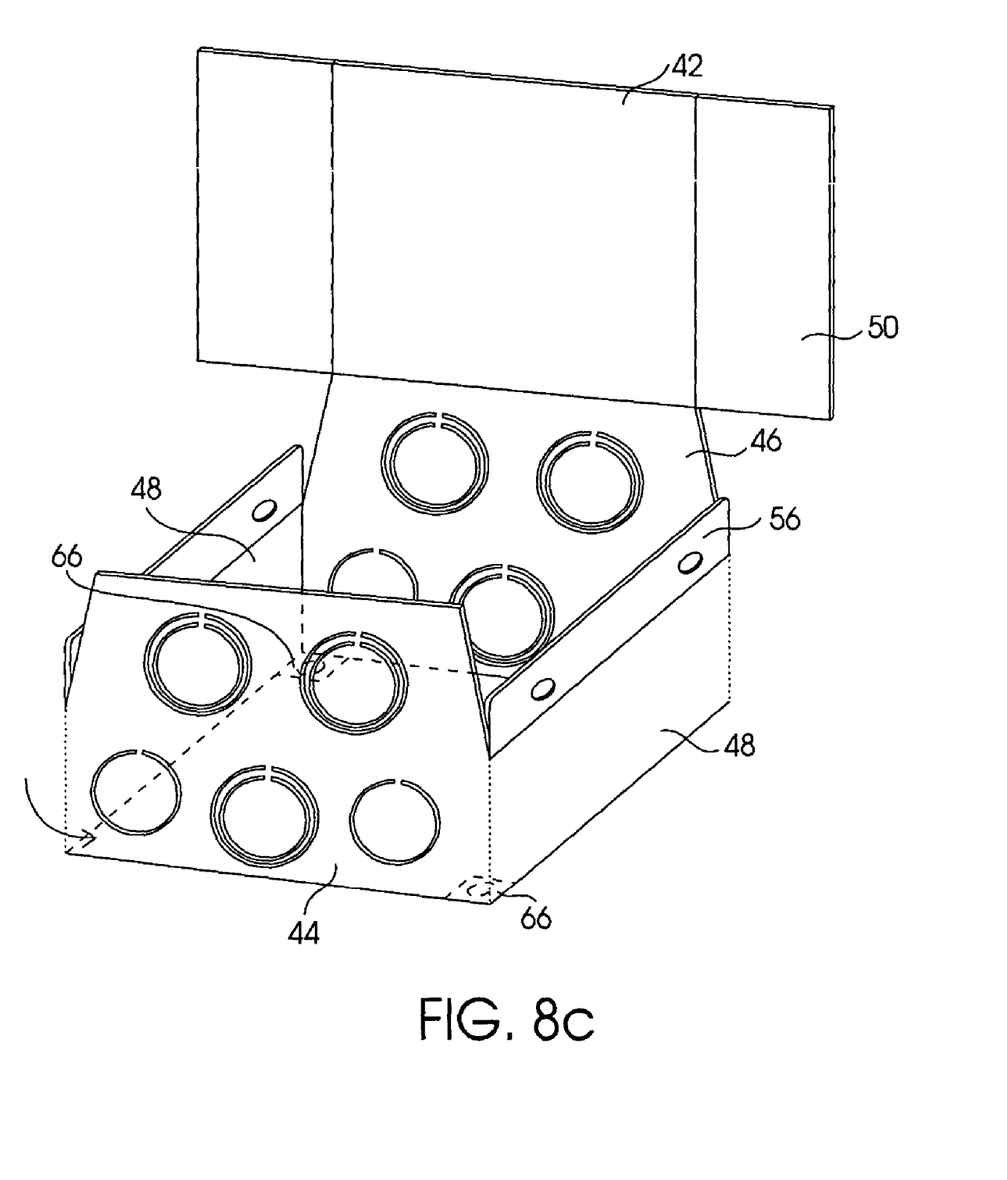

Turning to FIGS. 8a–8d, the back 46 is rotated 90° toward the first sidewall 48 wherein the top 42 and the bevel portions 50 also rotate with the back 46 as shown in FIG. 8a. Next, the first sidewall 48 connected to the back 46 is rotated 90° toward the front 44 positioning the back 46 in an opposite relation to the front 44 as shown in FIG. 8b. The second sidewall 48 connected to the front 44 is then rotated 90° toward the front 44 to meet the back 46i as shown in FIG. 8c.

Figure 8D:
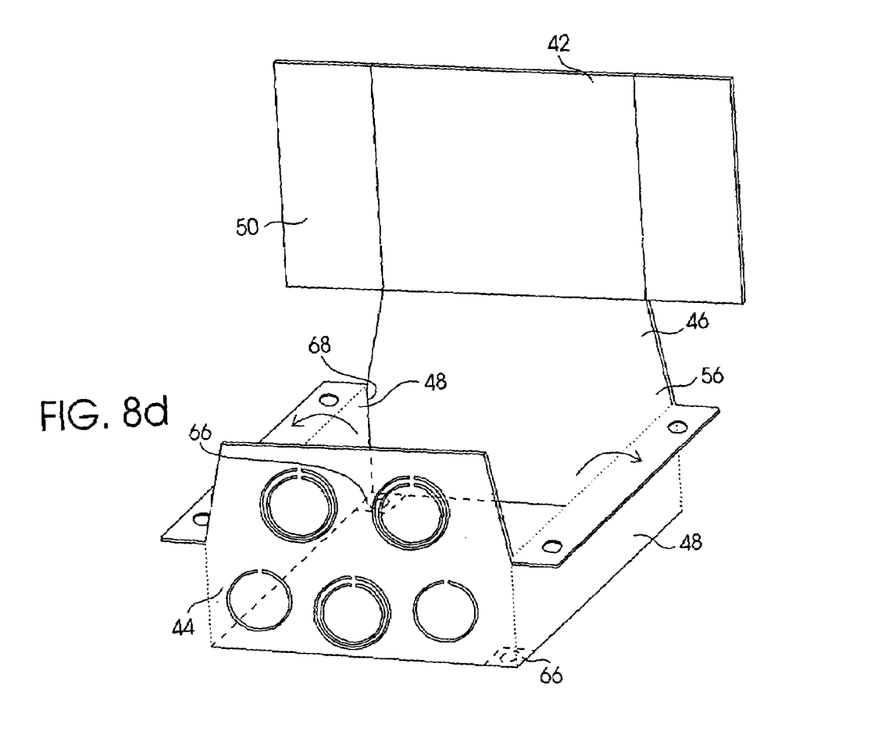

Turning to FIG. 8d, the flanges 56 are then folded downward from the sidewalls 48 to extend outwardly from the sidewalls 48. Accordingly, the flanges are disposed in a common plane relative to one another and at right angles to the sidewalls 48 while also being positioned below the bevel portions 50.

Figure 8E:
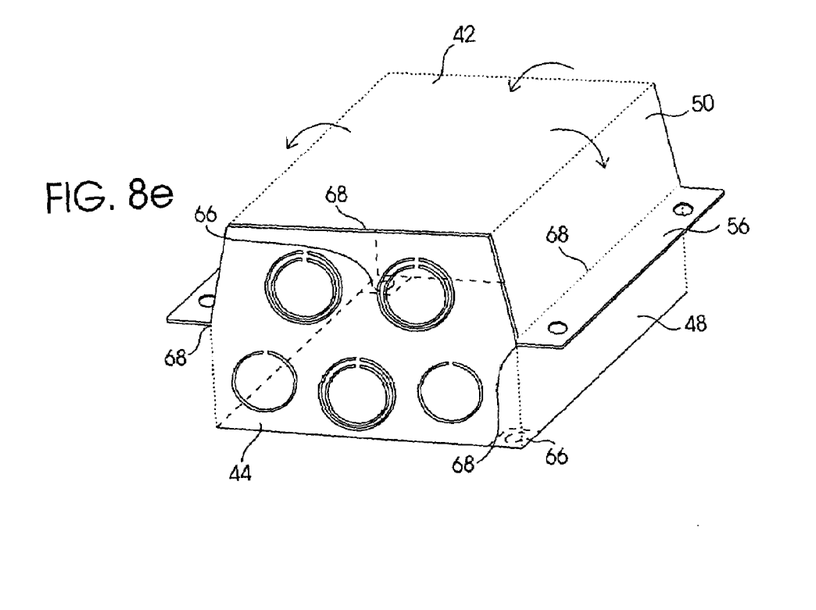

Turning to FIG. 8e, the top 42 is then folded downward to connect the front 44 and the back 46 while the bevel portions 50 are folded to extend downwardly from the top 42 toward the sidewalls 48 at an angle less than or equal to 90° to form the conduit box 42.

Next, the conduit box 42 is welded together. During manufacturing, the flat piece 62 comprising the different sections limits the number of welds 64 required to complete the conduit box 42. As shown in FIG. 8e, two welds 68 are needed to connect the bevel portions 50 to the respective sidewalls 48. A third weld 68 is needed to connect the top 42 to the front 44 while a fourth weld 68 (shown in FIG. 8d) is needed to connect the back 46 to the second sidewall 48. Additionally, two welds 68 are used to strengthen the flanges 56 in an embodiment. As known in the art, the order of rotation and folds can be altered. However, regardless of the order of rotations and folds, the number of welds 64 will maximize at six since the front 44, the back 46, the top 42, the sidewalls 48 and the bevel portions 50 are stamped into the same flat work piece 62. Thus, instead of welding each corner of the conduit box 42, the present invention limits the welds typically used to make a more efficient manufacturing of the conduit box 42.

Additionally, the plurality of knock outs 54 are stamped wherein at least one knock out 54 is positioned on the front 44 and the back 46 in a relation wherein the at least one knock out 54 is stamped above the sidewalls 48. Accordingly, when the conduit box 42 is installed, the at least one knock out 54 is positioned near the bevel portions 50 to allow the conduit 30 to connect to the conduit box 42 without offsets 36.

From the foregoing, it will be observed that numerous modifications and variations can be effected without departing from the true spirit and scope of the novel concept of the present invention. It is to be understood that no limitation with respect to the specific apparatus illustrated herein is intended or should be inferred. It is of course intended to cover by the appended claims all such modifications as fall within the scope of the claims.

I claim:

1. In a building structure, the building structure having upright walls and a roof structure, the roof structure having a coating layer, an insulation layer positioned below the coating layer and a deck layer positioned below the insulation layer wherein the deck layer includes at least one corrugated channel formed by downwardly projecting beveled channel sides connected by a channel top and terminated by a channel bottom wherein at least one conduit is disposed within the corrugated channel, the improvement, comprising;

a box, the box being sized and shaped within the downwardly projecting beveled channel sides, the box having a top, a front, a back and opposed sidewalls wherein the top includes bevel portions, the bevel portions extending downwardly from the top toward the sidewalls, the bevel portions being shaped to nest within the downwardly projecting channel sides provided by the corrugated channel while the sidewalls vertically extend downward from the bevel portions to be perpendicular to the top; and a pair of flanges, the flanges being positioned on the sidewalls below the bevel portions to extend outwardly from the bevel portions and the sidewalls, the flanges being sized and shaped to be positioned co-planar in abutment with the channel bottom while positioning the box within the corrugated channel wherein the at least one conduit is disposed through the corrugated channel and the box such that the at least one conduit is free of offsets between the corrugated channel and the box.

2. The building structure according to claim 1, wherein the bevel portions bevel at an angle less than or equal to 90°.

3. The building structure according to claim 2, wherein the angle is 45°.

4. The building structure according to claim 1, wherein the flanges provide the only points of engagement between the deck layer and the box and with the box being otherwise in gap or spaced relation to the deck layer when in assembled relation.

5. The building structure according to claim 1, further comprising fasteners which detachably fasten the flanges to the channel bottom.

6. The building structure according to claim 5, wherein the fasteners terminate within a horizontal plane defined by the channel bottom and the channel top.

7. A device for aligning conduit positioned within a corrugated deck layer which is positioned under a roof structure, comprising:

a box, the box having a top, a front, a back and opposing sidewalls, the top includes bevel portions downwardly extending from the top to the sidewalls while the sidewalls vertically extend from the bevel portions to be positioned perpendicular with the top, the bevel portions being sized and shaped to nest within the corrugated deck layer; and a pair of flanges, the flanges being disposed in a common plane relative to one another and at right angles to the sidewalls below the bevel portions to extend outwardly from the bevel portions and the sidewalls, the flanges being detachable from the sidewalls and sized and shaped to fasten the box to the corrugated deck layer.

* * * * *